United States Patent
Yasuoka et al.

(10) Patent No.: US 8,559,143 B2
(45) Date of Patent: Oct. 15, 2013

(54) VEHICLE CONTROL SYSTEM

(75) Inventors: Ikuo Yasuoka, Tokyo (JP); Shinichi Toda, Tokyo (JP); Mitsuhiro Numazaki, Tokyo (JP); Hidetoshi Manabe, Tokyo (JP); Takashi Takagi, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 13/164,846

(22) Filed: Jun. 21, 2011

(65) Prior Publication Data

US 2011/0316460 A1  Dec. 29, 2011

(30) Foreign Application Priority Data

Jun. 28, 2010  (JP) .................. 2010-146947

(51) Int. Cl.
  *H02H 3/00*  (2006.01)
(52) U.S. Cl.
  USPC ........ 361/42; 318/400.26; 318/801; 318/434; 318/400.22; 361/93.9; 361/50; 361/47
(58) Field of Classification Search
  USPC ............... 318/400.22, 635, 432, 434, 700; 324/500, 509, 521, 522, 523, 526, 531, 324/537; 361/1, 5, 6, 7, 63, 87, 93.1, 93.7, 361/50, 47, 42; 323/274, 284; 340/650; 180/14.1, 65.285
  See application file for complete search history.

(56) References Cited

U.S. PATENT DOCUMENTS

| | | | | |
|---|---|---|---|---|
| 5,448,442 | A  * | 9/1995 | Farag | 361/24 |
| 6,278,256 | B1 | 8/2001 | Aoyama | |
| 6,456,030 | B1 * | 9/2002 | Masaki et al. | 318/700 |
| 7,271,557 | B2 * | 9/2007 | Ajima et al. | 318/400.01 |
| 7,485,980 | B2 * | 2/2009 | Ichinose et al. | 290/44 |
| 8,049,455 | B2 * | 11/2011 | Kitanaka | 318/563 |
| 8,185,342 | B2 * | 5/2012 | Yeh et al. | 702/145 |
| 8,269,451 | B2 * | 9/2012 | Kitanaka | 318/801 |
| 2002/0043953 | A1 * | 4/2002 | Masaki et al. | 318/700 |
| 2010/0097733 | A1 * | 4/2010 | E. | 361/42 |
| 2010/0253267 | A1 * | 10/2010 | Kitanaka | 318/400.26 |
| 2012/0019183 | A1 * | 1/2012 | Sakane et al. | 318/473 |

FOREIGN PATENT DOCUMENTS

JP  08-182105  12/1996

* cited by examiner

*Primary Examiner* — Rita Leykin
(74) *Attorney, Agent, or Firm* — Baker Botts L.L.P.

(57) ABSTRACT

A system and method for a vehicle control system is disclosed herein. The system includes an inverter circuit, a permanent magnet synchronous motor, and a crossover connected between the inverter circuit and the permanent magnet synchronous motor. The system may also include at least one current sensor installed between the inverter circuit and the permanent magnet synchronous motor. A contactor may also be connected between the inverter circuit and the permanent magnet synchronous motor and may pass or shut off electricity between the inverter circuit and the permanent magnet synchronous motor. The system may also include a control unit connected to the contactor and the current sensor. The control unit may detect a current abnormality using information from the current sensor and open the contactor if an abnormality is detected.

20 Claims, 3 Drawing Sheets

VEHICLE CONTROL SYSTEM

This application is based upon and claims the benefit of priority from Japanese Patent Application No. 2010146947, filed Jun. 28, 2010, the entire contents of which are incorporated herein by reference.

TECHNICAL FIELD

Embodiments described herein relate generally to a vehicle control system.

BACKGROUND

Conventionally, an induction motor is widely used as a driving system for a railroad vehicle. However, due to energy-saving considerations, a driving system with a permanent magnet synchronous motor has recently become widespread. In a permanent magnet synchronous motor, a magnet implanted in a rotor generates a magnetic field and creates current in the rotor. Unlike an induction motor, the permanent magnet synchronous motor has no current loss in the rotor and no heat generation caused by the current loss. Accordingly, the driving system with a permanent magnet synchronous motor has higher efficiency than a driving system with an induction motor.

On the other hand, implanting the magnet in the rotor of a permanent magnet synchronous motor has negative effects. One of the negative effects is an induced voltage. The induced voltage is generated by the implanted magnet and increases commensurately to a rotating speed. During high-speed rotation, the induced voltage may exceed a DC voltage of an inverter circuit that controls the device. When the induced voltage exceeds the DC voltage of the inverter circuit, an regeneration operation is automatically started. Therefore, even when a railroad vehicle is running on inertia, it is necessary that the current be intentionally passed to suppress the induced voltage in order to weaken a magnetic flux.

Other problems occur when a motor and an inverter circuit for the motor are placed in different vehicles. In such cases, an interconnection between the vehicle of the motor and the vehicle of the inventor is necessary. Short circuits may occur in the interconnection. When a short-circuit accident or a ground fault accident occurs between the inverter circuit and the permanent magnet synchronous motor, regeneration is prevented and the magnetic flux caused by the induced voltage interferes with the normal operation of the permanent magnet synchronous motor. These problems do not occur in an induction motor.

SUMMARY

To achieve the above-described object, a vehicle control system according to the present disclosure includes an inverter circuit, a permanent magnet synchronous motor, and a crossover connected between the inverter circuit and the permanent magnet synchronous motor. The system may also include at least one current sensor installed between the inverter circuit and the permanent magnet synchronous motor. A contactor may also be connected between the inverter circuit and the permanent magnet synchronous motor and may pass or shut off electricity between the inverter circuit and the permanent magnet synchronous motor. The system may also include a control unit connected to the contactor and the current sensor. The control unit may detect a current abnormality using information from the current sensor and open the contactor if an abnormality is detected. A current abnormality may be a member from the group consisting of a two-phase short circuit, a three-phase short circuit, and a ground fault accident. The system may also comprise three current lines located between the inverter circuit and the permanent magnet synchronous motor, with two of the three lines including a current sensor. Detecting a two-phase short circuit may include determining the respective phases of currents on the lines based upon information provided by the sensors and opening the contactor if the currents are not within a predetermined phase difference from one another, where the predetermined phase difference is 120 degrees. Detecting a three-phase short circuit may include determining current values of the three current lines and opening the contactor when a current value exceeds a predetermined level. Detecting a ground fault may include determining the current between the inverter circuit and ground and opening the contactor when the current is greater than a predetermined current.

A method is disclosed that includes providing electricity from an inverter to a permanent magnet synchronous motor; connecting the inverter to the permanent magnet synchronous motor with a crossover; measuring the electricity provided to the permanent magnet synchronous motor; and controlling the electricity provided to the permanent magnet synchronous motor by detecting whether there is an abnormality associated with providing electricity to the permanent magnet synchronous motor, and opening a contactor located between the inverter and the permanent magnet synchronous motor if an abnormality is detected. The abnormality may be a member from the group consisting of a two-phase short circuit, a three-phase short circuit, and a ground fault accident. The crossover may include three current lines, two of the three lines including a current sensor. Detecting the two-phase short circuit may comprise of determining whether a phase difference between the phases of the electrical current on at least two of the three current lines differs by a predetermined phase difference, such as 120 degrees. Detecting the three-phase short circuit may comprises determining whether at least one current value of the three current lines exceeds a predetermined level. Detecting the ground fault may comprise determining whether the current between the inverter and ground exceeds a predetermined current.

An additional system may include an inverter circuit that controls an electric power supplied from an overhead wire so as to be able to drive the electric power, a permanent magnet synchronous motor that is driven by the electric power from the inverter circuit as a driving force, a crossover that is connected between the inverter circuit and the permanent magnet synchronous motor, an AC current detection sensor that is installed between the inverter circuit and the crossover to detect a current, a contactor that is connected between the crossover and the permanent magnet synchronous motor to be able to perform electric open and power-on, a DC current sensor that between the inverter circuit and ground, and a control unit that is connected to the contactor, the AC current sensor, and the DC current sensor. The control unit may determine an abnormality of the crossover, such as a ground fault accident and a short-circuit accident, which is generated in a driving system. The determination may be based on the current value detected from at least one of the AC current sensor and the DC current sensor. The control unit outputs an open instruction to the contactor when sensing the abnormality.

DETAILED DESCRIPTION

Embodiments of the present disclosure will be described below with reference to the drawings. A configuration of a vehicle control system according to a first embodiment of the disclosure will be described with reference to FIG. 1.

Figure 1:
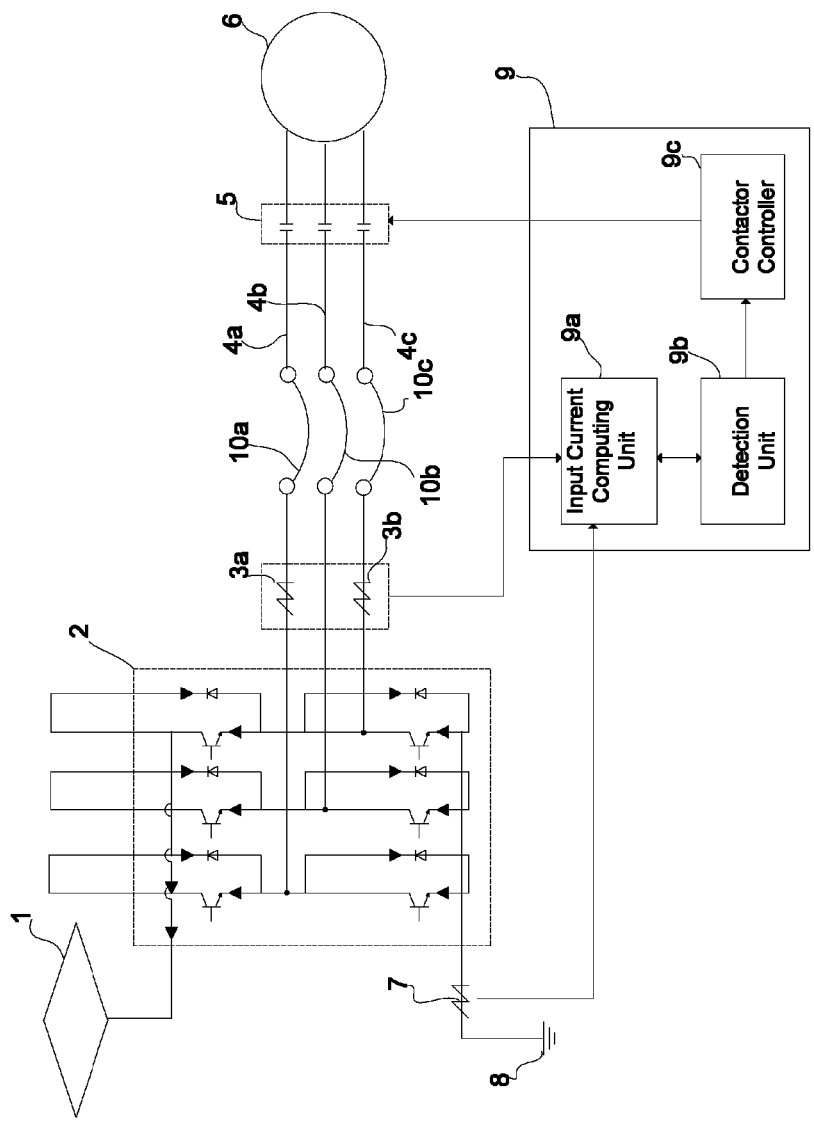
FIG. 1 is a block diagram of a vehicle control system according to a first embodiment.

Referring to FIG. 1, the vehicle control system of the first embodiment may include a pantograph 1, an inverter circuit 2, a first current sensor 3a, a second current sensor 3b, a U-phase line 4a, a V-phase line 4b, a W-phase line 4c, a contactor 5, a permanent magnet synchronous motor 6, a third current sensor 7, a ground 8, a control unit 9, an input current computing unit 9a, a detection unit 9b, a contactor controller 9c, a U-phase crossover 10a, a V-phase crossover 10b, and a W-phase crossover 10c.

The pantograph 1 and the ground 8 may be connected with the inverter circuit 2 on a DC side. The third current sensor 7 may be connected between the inverter circuit 2 and the ground 8. On an AC side of the inverter circuit 2, which is opposite to the DC side, the inverter circuit 2 and the permanent magnet synchronous motor 6 may be connected through the first current sensor 3a, U-phase crossover 10a, and contactor 5 on the U-phase line 4a. The inverter circuit 2 and the permanent magnet synchronous motor 6 may be connected through the V-phase crossover 10b and contactor 5 on the V-phase line 4b. The inverter circuit 2 and the permanent magnet synchronous motor 6 may be connected through the second current sensor 3b, W-phase crossover 10c, and contactor 5 on the W-phase line 4c.

The control unit 9 may be connected to the first current sensor 3a, the second current sensor 3b, the third current sensor 7, and the contactor 5. The input current computing unit 9a incorporated in the control unit 9 may be connected to the first current sensor 3a, the second current sensor 3b, the third current sensor 7, and the detection unit 9b. The detection unit 9b may be connected to the input current computing unit 9a and the contactor controller 9c. The contactor controller 9c may be connected to the detection unit 9b and the contactor 5.

The functionality of the embodiment of FIG. 1, according to aspects of the present disclosure, will be described below. A DC electric power may be supplied to the inverter circuit 2 through the pantograph 1. The inverter circuit 2 may convert the input DC electric power into an AC electric power. The converted AC electric power may be input to the permanent magnet synchronous motor 6 through the contactor 5 that is usually in on/closed state. Before reaching the permanent magnet synchronous motor 6, the AC electric power may be detected by the first current sensor 3a in a U-phase and the second current sensor 3b in a W-phase. The third current sensor 7 may detect a return current on the DC side of the inverter circuit 2.

The current detected by the first current sensor 3a, the second current sensor 3b and the third current sensor 7 may be input to the control unit 9. In the control unit 9, an input current computing unit 9a may compute an input current level for the three inputs. Based on the current values computed in the input current computing unit 9a, the detection unit 9b may determine whether an abnormality, such as a contact fault or a ground fault, exists in the drive system. When the detection unit 9b determines that an abnormality exits, it may signal a contactor controller 9c. The contactor controller 9c may respond to the signal from the detection unit by triggering some or all of the contactors 5 to open/close.

Figure 2:
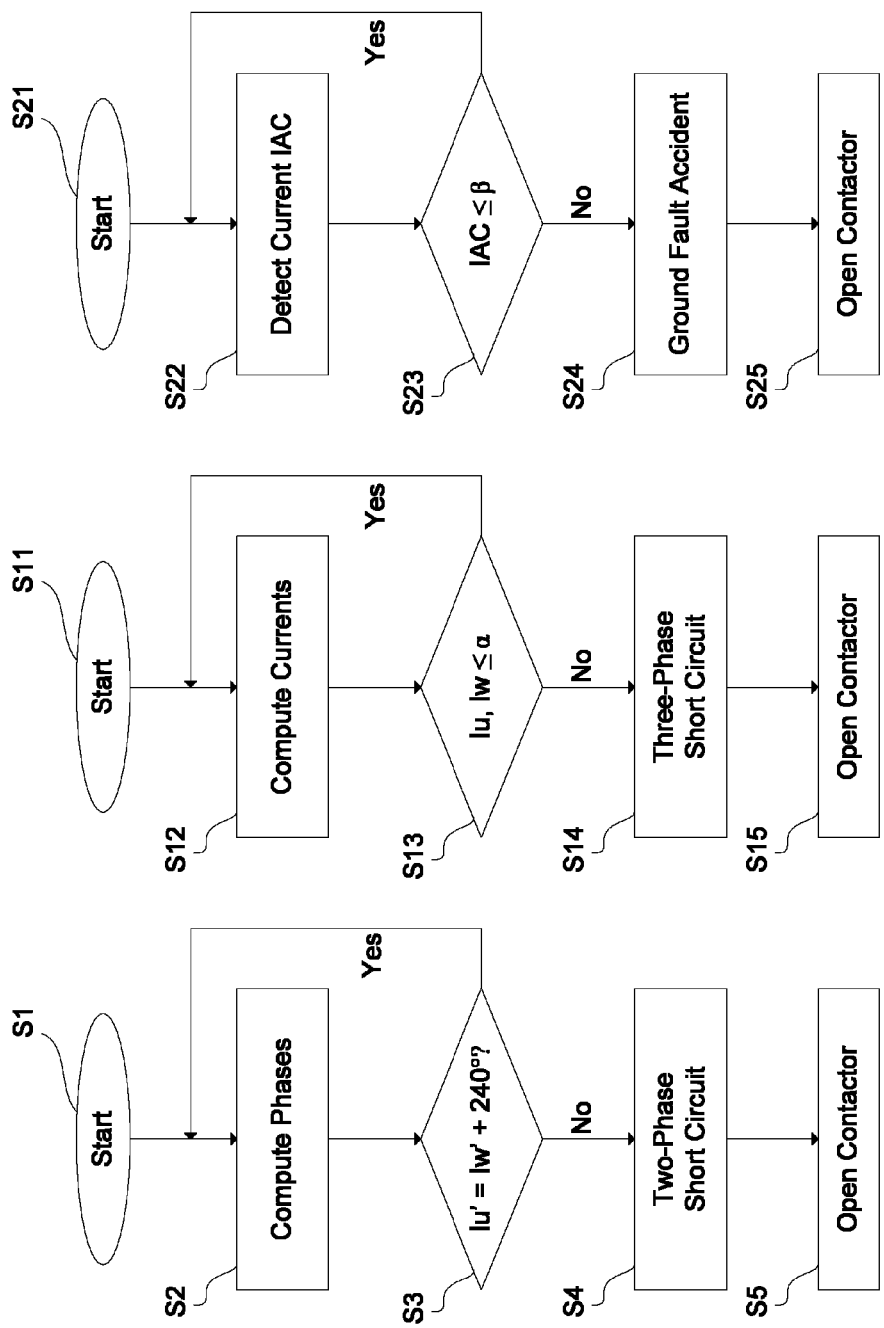
FIGS. 2A, 2B, and 2C are flow diagrams describing methods for detecting system abnormalities according to aspects of the present disclosure.

One example embodiment of a control unit, such as control unit 9 of FIG. 1, is described below. The example control unit embodiment will be described below with reference to FIG. 2. As illustrated in FIG. 2A, the process may start at a step S1. At step S2 the control unit may receive a current Iu detected by a first current sensor in a U-phase line and a current Iw detected by a second current sensor in a W-phase line. An input current computing unit of the control unit may receive detected currents Iu and Iw and compute phases Iu', Iv', and Iw', where phases Iu', Iv', and Iw' correspond to the phase of the U-phase line, V-phase line, and W-phase line, respectively. The phase Iv' may be computed based on the current Iu and Iw and the phases Iu' and Iw'. The phases Iu', Iv', and Iw', may then be input to a detection unit, such as detection unit 9b from FIG. 1. At step S3, the detection unit may compare the phase of some or all of the current Iu, Iv and Iw. For example, the detection unit may determine whether the phase Iw' lags behind the phase Iu' by a predetermined phase, such as 240°. If the phase Iw' lags behind the phase Iu' by 240°, the detection unit may judge that the system is working properly and steps S2-S3 may be repeated. The detection unit may also recognize other predetermined phase deviations between Iu', Iv', and Iw', such as whether the phase Iv' lags behind the phase Iu' by 120° or whether the phase Iw' lags behind the phase Iv' by 120°.

On the other hand, if the phase Iw' does not lag behind the phase Iu' by 240°, or another phase deviation exists, the detection circuit may determine at step S4 that an abnormality exists. One example abnormality indicated by a phase deviation may be a two-phase short-circuit generated, for example, by the wiring in the U-phase crossover 10a and the V-phase crossover 10b. When a two-phase short-circuit is recognized, the detection unit may transmit a signal to a contactor controller. When the contactor controller receives the signal, the contactor controller may cause a contactor to open at step S5.

In addition to phase deviations, certain embodiments of a control unit may detect current deviations, as illustrated in FIG. 2B. At step S12, a control unit, such as the control unit 9 of FIG. 1, may receive a current Iu detected by a first current sensor, such as current sensor 3a in a U-phase line, and a current Iw detected by a second current sensor, such as second current sensor 3b, in a W-phase line. Using the detected current Iu and the detected current Iw, an input current computing unit, such as input current computing unit 9a, of the control unit may compute the current values of the current Iu, the current Iv, and the current Iw. The current values of the current Iu, the current Iv, and the current Iw may then be input to the detection unit, such as detection unit 9b of FIG. 1. At step S13, the detection unit may judge whether the computed current values Iu and Iw exceed a predetermined value α. The predetermined value may be, for example, a proportion between current Iu and Iw or an overall current difference. If the computed current values Iu and Iw do not exceed the predetermined value α, then there is not a system abnormality, and the control unit may repeat steps S11 through S13.

On the other hand, if the computed current values of the current Iu and the current Iw exceed the predetermined value α, the detection unit may determine that a system abnormality exists at step S14. In FIG. 2B, for example, the fact that currents Iu and Iw exceed the predetermined value α may indicate that the abnormality is a three-phase short-circuit. A three-phase short circuit may be generated by shorts in crossover wiring, such as the pieces of wiring of the U-phase crossover 10a, the V-phase crossover 10b, and the W-phase crossover 10c from FIG. 1. Therefore, three-phase short-circuit are recognized. When a three-phase short-circuit is recognized, the detection unit may input a signal to the contactor controller. At step S15, the contactor controller may receive the signal from the detection unit and trigger the contactor, such as contactor 5 in FIG. 1, to open.

Certain embodiments of a control unit may also detect ground fault accidents. On example method for detecting ground fault accidents is illustrated in FIG. 2C. At step S22, a control unit may receive a current IAC detected by a third current sensor, such as third current sensor 7 from FIG. 1, on the DC return side of the inverter circuit, such as inverter circuit 2. The current IAC may be the short circuit current of the system. A detection unit in the control unit may receive the detected current IAC through an input current computing unit, such as input current computing unit 9a, or the detection unit may receive the detected current IAC directly. At step S23, the detection unit may judge whether the current IAC exceeds a predetermined value β. The predetermined threshold value β may be selected as a threshold value based on at least one abnormality condition. If the current IAC does not exceed the predetermined value β, a ground fault accident has not occurred, and the control unit may repeat steps S21-S23.

On the other hand, if the detected current IAC exceeds the predetermined value β, the detection unit may judge that an abnormality, such as a ground fault accident, exists at step S24. A ground fault accident may be generated when a short occurs between two pieces of crossover wiring, such as the wiring in the U-phase crossover 10a, the V-phase crossover 10b, and the W-phase crossover 10c from FIG. 1. When the ground fault accident is recognized, the detection unit may input a signal to a contactor controller. At step S25, the contactor controller may receive the signal and trigger a contactor to open.

Figure 3:
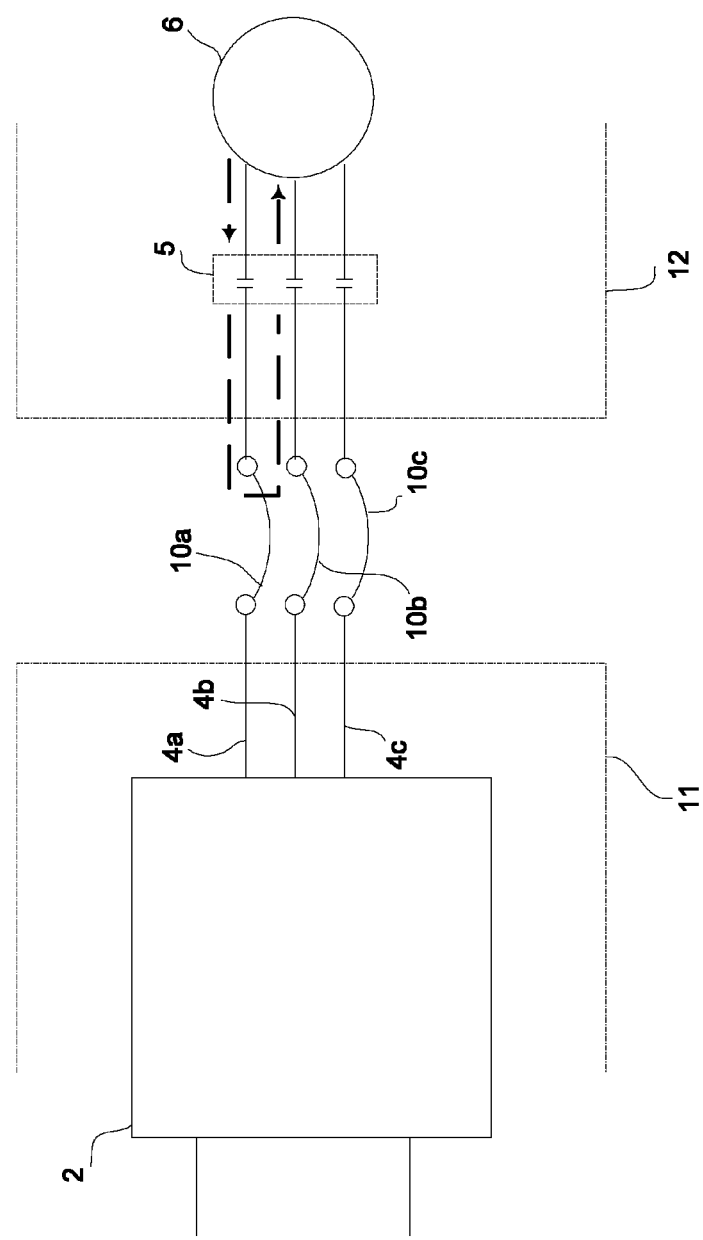
FIG. 3 is a block diagram of a vehicle control system according to aspects of the present disclosure.

An example embodiment of a vehicle control system, such as the vehicle control system in FIG. 1, is shown in FIG. 3. In FIG. 3, the inverter circuit 2 is placed in a first module 11, and the permanent magnet synchronous motor 6 and the contactor 5 is placed in a second module 12.

Accidental circuits may occur between module 11 and module 12. For example, accidental circuits, such as a ground fault accident, may occur when U-phase crossover 10a and a V-phase crossover 10b connect. The connection between the crossovers may cause current output by the permanent magnet synchronous motor 6 to be returned to the permanent magnet synchronous motor 6. For example, when the short-circuit is generated in the U-phase crossover 10a and the V-phase crossover 10b, the current may keep passing through the permanent magnet synchronous motor 6, the inverter circuit 2 and so on, without being reclaimed or dissipated. This may overload the motor and circuitry, and obstruct the running of the railroad vehicle. However, when the contactor 5 opens, the current outputs from the permanent magnet synchronous motor 6 will stop. With the contactor 5 open, the current is prevented from passing through the instruments including the permanent magnet synchronous motor 6.

According to the embodiments of the vehicle control system above, the vehicle control system is advantageous in that it can protect the inverter circuit even if a contact fault between different conductors or the ground fault is generated.

While certain embodiments of a vehicle control system have been described, these embodiments have been presented by way of example only, and are not intended to limit the scope of the disclosure. Indeed, the novel systems described herein may be embodied in a variety of other forms; furthermore, various omissions, substitutions and changes in the form of the systems described herein may be made without departing from the spirit of the disclosure. The accompanying claims and their equivalent are intended to cover such forms or modifications as would fall within the scope and spirit of the disclosure.

What is claimed is:

1. A system comprising:
an inverter circuit;
a permanent magnet synchronous motor;
a crossover connected between the inverter circuit and the permanent magnet synchronous motor;
a current sensor connected between the inverter circuit and the permanent magnet synchronous motor;
a contactor connected between the crossover and the permanent magnet synchronous motor for passing electricity between the inverter circuit and the permanent magnet synchronous motor or shutting off electricity between the inverter circuit and the permanent magnet synchronous motor; and
a control unit connected to the contactor and the current sensor, the control unit operable to detect an abnormality using information from the current sensor and open the contactor if the abnormality is detected.

2. The system of claim 1 wherein the abnormality is a member from the group consisting of a two-phase short circuit, a three-phase short circuit, and a ground fault accident.

3. The system of claim 1 further comprising three current lines located between the inverter circuit and the permanent magnet synchronous motor, two of the three lines including a current sensor.

4. The system of claim 3 wherein the control unit is connected to the current sensors, and the control unit is operable to open the contactor when a two-phase short circuit is detected by:
determining the respective phases of currents on the lines based upon information provided by the sensors; and
opening the contactor if the currents are not within a predetermined phase difference from one another.

5. The system of claim 4 wherein the predetermined phase difference is 120 degrees.

6. The system of claim 3 wherein the control unit is connected to the current sensors, and the control unit is operable to open the contactor when a three-phase short circuit is detected by:
determining current values of the lines; and
opening the contactor when a current value exceeds a predetermined level.

7. The system of claim 1 further comprising a current sensor connected between the inverter circuit and ground, the sensor in communication with the control unit, wherein the control unit is operable to open the contactor when a ground fault is detected by:
determining the current between the inverter circuit and ground; and
opening the contactor when the current is greater than a predetermined current.

8. A method for a vehicle control system comprising:
providing electricity from an inverter to a permanent magnet synchronous motor;
connecting the inverter to the permanent magnet synchronous motor with a crossover;
measuring the electricity provided to the permanent magnet synchronous motor; and
controlling the electricity provided to the permanent magnet synchronous motor by:
detecting whether there is an abnormality associated with providing electricity to the permanent magnet synchronous motor; and opening a contactor located between the crossover and the permanent magnet synchronous motor if an abnormality is detected.

9. The method of claim 8 wherein the abnormality is a member from the group consisting of a two-phase short circuit, a three-phase short circuit, and a ground fault accident.

10. The method of claim 9 wherein the crossover includes three current lines, two of the three lines including a current sensor.

11. The method of claim 10 wherein detecting the two-phase short circuit comprises determining whether a phase difference between the phases of the electrical current on at least two of the three current lines differs by a predetermined phase difference.

12. The method of claim 11 wherein the predetermined phase difference is 120 degrees.

13. The method of claim 10 wherein detecting the three-phase short circuit comprises determining whether at least one current value of the three current lines exceeds a predetermined level.

14. The method of claim 10 wherein detecting the ground fault comprises determining whether the current between the inverter and ground exceeds a predetermined current.

15. A vehicle control system comprising:
an inverter circuit that receives power from an overhead wire;
a permanent magnet synchronous motor driven by power provided by inverter circuit;
a crossover connected between the inverter circuit and the permanent magnet synchronous motor;
an AC current detection sensor installed between the inverter circuit and the crossover;
a contactor that is connected between the crossover and the permanent magnet synchronous motor;
a DC current detection sensor that is connected between the inverter circuit and ground; and
a control unit that is connected to the contactor, the AC current sensor, and the DC current sensor, wherein the control unit senses an abnormality based on the current value from at least one of the AC current sensor and the DC current sensor, and outputs an open instruction to the contactor.

16. The system of claim 15 wherein the crossover includes a plurality of flexible wires and an abnormality occurs when at least two of the plurality of flexible wires short circuit.

17. The system of claim 15 wherein the control unit includes an input current computing unit, a detection unit, and a contactor controller.

18. The system of claim 17 wherein the AC current detection sensor and the DC current detection sensor are connected to the input current computing unit.

19. The system of claim 18 wherein the detection unit receives at least one current value computed at the input current computing unit and determines whether an abnormality exists based at least in part on the current value.

20. The system of claim 19, wherein the detection unit signals the contactor controller if an abnormality exists and the contactor controller triggers the contactor to open the circuit from the inverter circuit to the permanent magnet synchronous motor.

* * * * *